April 25, 1961   W. D. DAVIS ET AL   2,981,008
VISUAL APPARATUS FOR A FLIGHT TRAINER
Filed Jan. 22, 1959   3 Sheets-Sheet 1
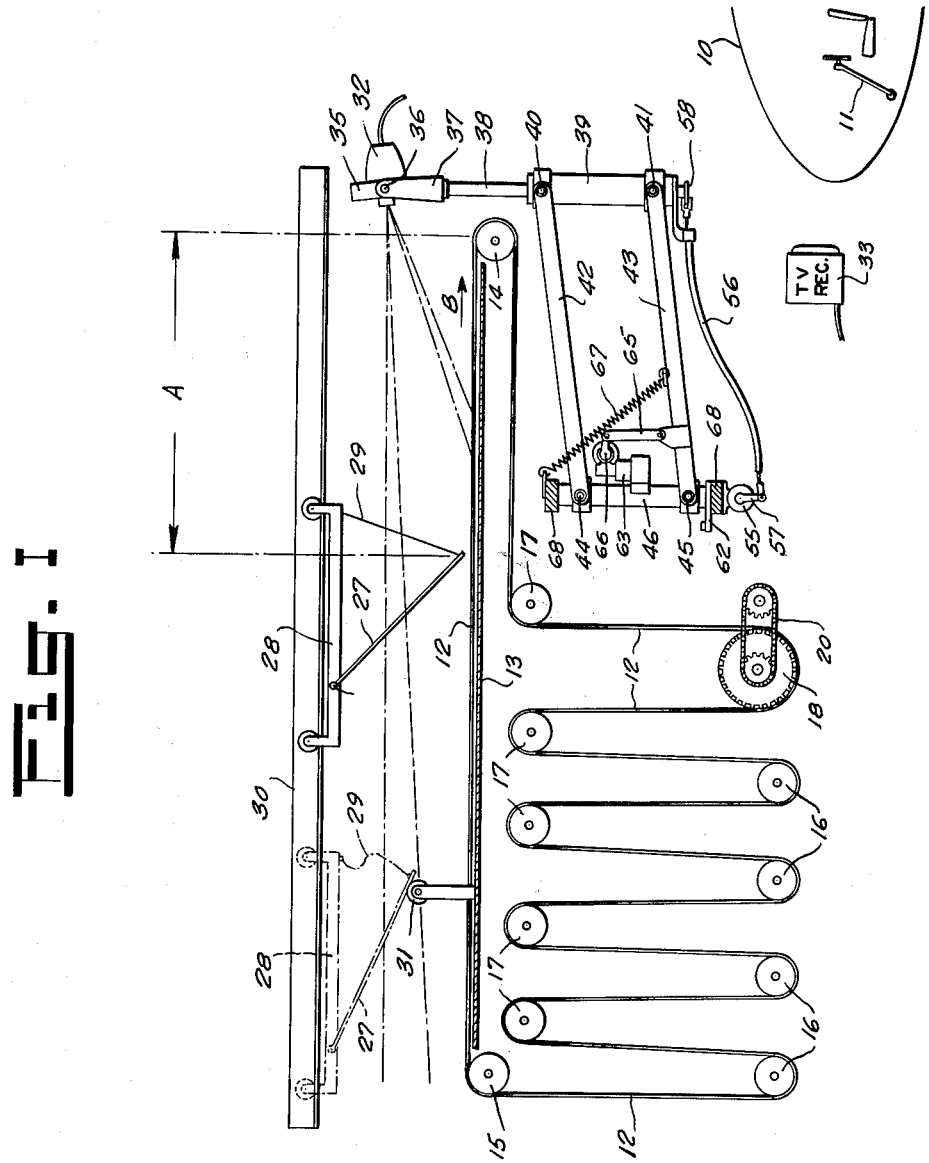
INVENTORS
WARD D. DAVIS, STEPHEN DUPONT,
RICHARD J. ZEITLER, WILLIAM R. BATESOLE
ARTHUR R. TUCKER, LEIF W. HANSON.
BY John M. Montstream
ATTORNEY

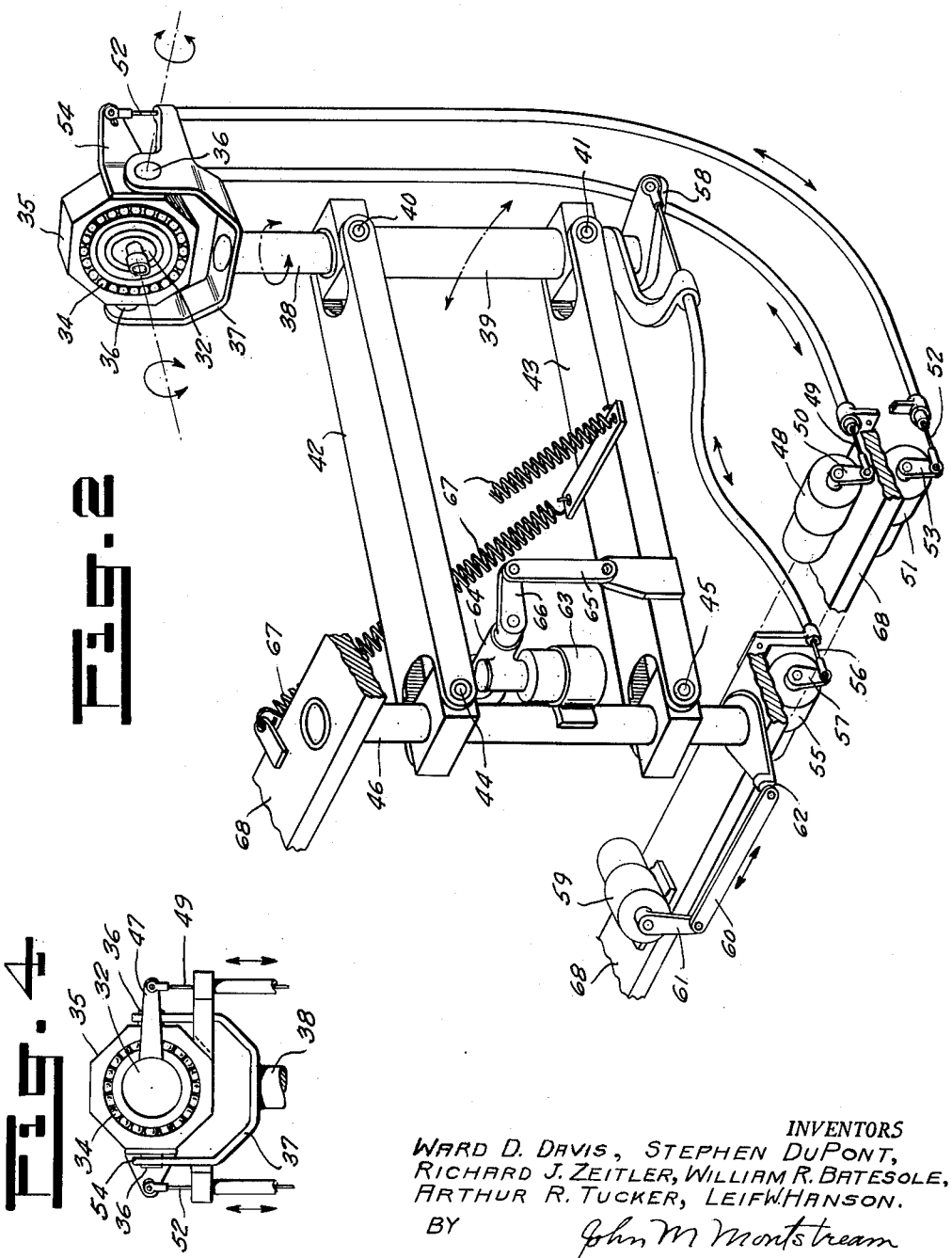

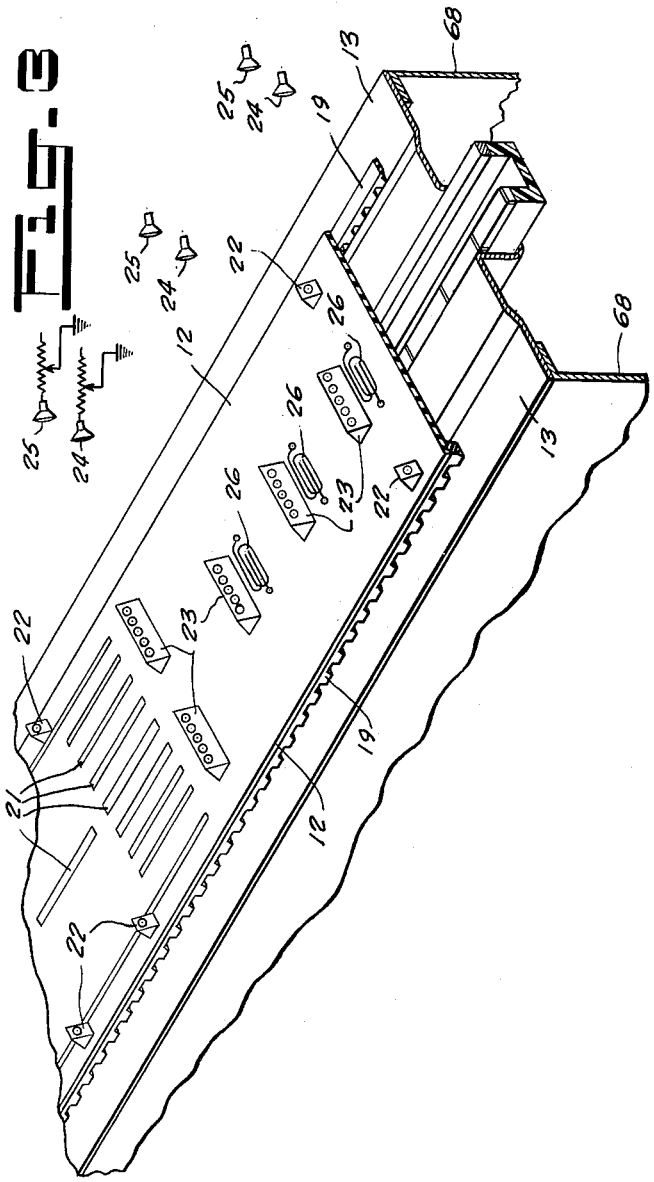

United States Patent Office 2,981,008
Patented Apr. 25, 1961

2,981,008

VISUAL APPARATUS FOR A FLIGHT TRAINER

Ward D. Davis, Fairfax, Va., and Stephen du Pont, Westport, Richard J. Zeitler, Danbury, William R. Batesole, Ridgefield, and Arthur R. Tucker and Leif W. Hanson, Danbury, Conn., assignors to Dalto Corporation, New York, N.Y., a corporation of Delaware Filed Jan. 22, 1959, Ser. No. 788,355

1 Claim. (Cl. 35—12)

This invention relates to an improved visual apparatus of the type usually used in conjunction with and as an attachment for a grounded flight trainer, which visual apparatus due to the improvements applied thereto is capable of simulating all of the conditions encountered while flying, landing and taking off an actual aircraft to a degree of realism and accuracy heretofore unattainable.

More particularly, the visual apparatus of the present invention is generally of the type disclosed in U.S. Patent No. 2,711,593, issued on June 28, 1955, to the patentees Lewis et al., in which a belt having airfield markings drawn to scale approximating those of an actual airfield under study is driven along its longitudinal axis, and which belt when viewed, as for example, at one end while partaking of this movement simulates the condition of a moving aircraft either landing on or taking off from, depending on the direction of longitudinal movement of said belt, the said simulated airfield under study.

As regards the grounded flight trainer with which the visual apparatus of the present invention is preferably used as an attachment, it will be understood to be the type which is equipped with the usual control stick, foot pedals and such other control equipment as is usually provided in the cockpit of an actual aircraft, and which further is equipped with any one of several known units for creating signals indicative or telltale of the degree of manipulation of said trainer controls and which is capable of feeding the same to the visual apparatus to the end of simulating the flight movements as would occur in actual flight as a result of such manipulation.

Thus, for example, assuming a pilot or trainee is seated in and operating the flight trainer, and further as will be more fully explained herein is able to experience through the operation of the visual apparatus the sensation of approaching an airfield, should he decide that successful landing requires an adjustment in altitude, the same is accomplished by manipulation of the appropriate controls of said flight trainer which, in turn, creates and feeds a signal corresponding to the degree of manipulation of the trainer controls to the visual apparatus. Thereupon, the visual apparatus in response to the signal fed thereto, by its intended mode of operation is then required to create, relative to the simulated airfield being observed, the appropriate visual impression simulating this change in altitude.

In like manner, and in addition to altitude variation, the flight motions of roll, pitch, lateral drift and yaw, making five such motions in all, will be understood to be initiated by appropriate manipulation of the controls of the flight trainer, and after such manipulation will be understood to result in signals created by the signal creating means usually provided as auxiliary equipment for said flight trainer being fed into the visual apparatus, which in response thereto is required to simulate the appropriate flight motion or combination of flight motions, as the case may be, relative to an observed simulated airfield. A flight trainer equipped and operating as above described and an associated signal creating and feeding means functioning as above described, for which the visual apparatus of the present invention is useful as an attachment, may be any one of several well known types, and does not form an essential part of the present invention except to the extent of being the unit creating and transmitting the signals to which the visual apparatus is required to respond, and as such comprising part of the environmental background for understanding the intended function and usefulness of the said visual apparatus.

From the above it should be appreciated that the required operation of the type of visual apparatus, of which the visual apparatus of the present invention is properly classified as an improved model, is to create in response to appropriate signal inputs thereto appropriate visual impressions simulating all of the conditions experienced when actually flying, landing and taking off an aircraft, and to the extent that said impressions are accurately and realistically created, said visual apparatus constitutes a valuable device for training new pilots and for maintaining the proficiency of experienced pilots.

To the above end, and as previously mentioned in connection with U.S. Patent No. 2,711,593, the visual apparatus of the present invention makes use of a belt having simulated airfield markings thereon and which when driven along its longitudinal axis either towards or away from a device used for viewing the belt, realistically simulates the impression of flight movement relative to the simulated airfield depicted on said belt. However, apart from this point of similarity, the visual apparatus of the present invention, as will be more fully explained subsequently herein, radically departs from prior art practice, and by the improvements applied thereto, is capable of simulating flight motions and flight conditions to a degree of realism and accuracy heretofore unattainable.

More particularly, it is one object of the present invention to provide a visual apparatus capable of responding to signal inputs calling for simulated flight motions with greater rapidity than heretofore has been possible, thereby more closely approximating actual flight conditions.

A further object is to provide a visual apparatus in which the operating means for simulating the usual flight motions of altitude variation, roll, pitch, lateral drift, and yaw are simpler and less expensive.

To accomplish these and other objects, the visual apparatus of the present invention is comprised of the combination with the previously mentioned prior art longitudinally moving belt, of a television camera properly positioned to view the same, and a mounting for said television camera capable of at least five degrees of movement to provide the five flight motions of altitude variation, roll, pitch, lateral drift and yaw. Thus, in contrast to prior art practice, and more particularly to that disclosed in U.S. Patent No. 2,711,593 in which the above named five flight motions are achieved by bodily moving the longitudinally driven belt relative to the device through which the said belt is viewed, these said five flight motions are achieved by moving the belt viewing device or television camera. As a result, and due to the considerably smaller mass of the television camera compared to that of the belt and the frame on which it is mounted, movements in response to signal inputs occur with greater rapidity and are achieved using less complicated and less costly apparatus.

Further in contrast to prior art practice, and more particularly to that disclosed in U.S. Patent No. 2,711,593 in which an optical device, such as a telescope, is used for viewing the said belt, the user being required to sight through the telescope, the use of a television camera offers noteworthy advantages over and above the fact that it permits observation of a simulated airfield. Among the more important of these advantages is that it permits the simulation of the flight movement of roll by merely rotating the television camera about its longitudinal axis, whereas with an optical viewing device through which the user sights the said belt, no observable change occurs or can occur because of rotation of the same.

The improved visual apparatus of the present invention will be better understood from the specification and drawings forming a part thereof, in which:

Fig. 1 is a side view of the visual apparatus of the present invention together with a fragmentary view of a grounded flight trainer;

Fig. 2 is an isometric view of a television camera and of a mount for the television camera;

Fig. 3 is a partial isometric view of the endless belt and its supporting table; and Fig. 4 is a rear view of the television camera shown in Fig. 2.

Referring to Fig. 1 there is shown one embodiment of the improved visual apparatus of the present invention together with a grounded flight trainer, generally designated 10. As regards the latter named unit or flight trainer 10, it will be understood that structure-wise it may be any one of several well known types, in which more particularly, the usual flight effecting controls as is usually found in the cockpit of an actual aircraft are provided, said controls being exemplified by the showing of a control stick 11. Further, as regards mode of operation of said trainer 10, it will be understood that in a well known manner by reason of manipulation of its said flight effecting controls, suitable signals are created by any one of several well known signals creating means (not shown) usually provided as auxiliary equipment for the said trainer, which signals are then fed to the visual apparatus attachment to the end of causing the same to create visual impressions simulating the flight motion or combined flight motions, as the case may be, which would result in actual flight as a result of such manipulation of said flight effecting controls.

In the above respect, the referred to flight motions which a visual apparatus for a flight trainer must be capable of simulating are firstly the basic motion of flight movement, and secondly the flight motions of roll, pitch, yaw, lateral drift and altitude variation.

Taking the basic motion of flight movement that is the impression of moving either towards or away from an observed point as for example as would occur while either landing or taking off from an airfield, as previously stated the same is simulated by the visual apparatus of the present invention utilizing a longitudinally driven belt substantially as is taught in U.S. Patent No. 2,711,593.

In this regard and as best seen in Fig. 1, an endless belt 12 is arranged to be driven along a horizontally disposed fixed support or table 13 being looped over transversely and horizontally disposed pulleys 14 and 15 suitably supported at opposite ends of said fixed table 13. Beneath said table 13, the belt 12 is further looped over spaced rollers 16 and 17 so as to have an appreciable length, and between two adjacent rollers 17 is drawn tightly about a driven pulley 18 having peripheral teeth thereon in driving engagement with a pair of notched strips 19 (see Fig. 3) provided on the underside and along the marginal edges of the belt 12. The belt 12 is thus adapted to be driven along its longitudinal axis when the driven pulley 18 is in turn driven through a pulley belt arrangement 20 by a suitable prime mover (not shown).

As best seen in Fig. 3, on the outer surface or visible side of the belt 12, there is suitably affixed thereto a plurality of typical airfield markings, such as for example, landing guide strips 21, landing field boundary lights 22, and approach lights 23, all of which are appropriately placed and scale dimensioned to simulate the markings of an actual airfield. Exemplifying a method by which said simulated airfield markings may be illuminated, it is proposed that where appropriate, they will have a coating of luminous paint which will be made to glow by a series of ultraviolet lamps 24 spaced above and along the length of the fixed table 13. To simulate dusk and dawn conditions, a series of white lights 25 may be selectively energized to mix with and thereby lessen the glow effect created by said ultraviolet lamps 24. In addition, part of the belt simulating airfield markings may comprise a plurality of aligned spaced lights 26 which by any suitable manner are made to flash in sequence during the running of the belt 12 to thereby simulate the flashing guide lights usually provided on an actual airfield.

Also forming part of the auxiliary equipment which may be provided for the belt 12 is an angularly disposed filter 27 pivotably connected at one end to a slidable carriage 28 and held at its other end from said carriage by a line 29. In practice, the carriage 28 may be moved along a track 30 on which it is slidably mounted to place the filter 27 in such a position as to block or obstruct visibility of the belt 12 to any degree desired, and thereby simulate visibility conditions as may be created by ground fog or the like. Thus, as shown in Fig. 1, filter 27 in its illustrated position along the longitudinal driven belt 12 will create the impression of poor visibility forward of an aircraft in simulated flight corresponding in distance to the distance denoted by the letter A. When not required, and as shown in phantom perspective, it is proposed that carriage 28 will be moved to an extreme position to the left, whereupon filter 27 will be raised by an upstanding roller 31 so as to only obstruct visibility of the area beyond pulley 15, which area if not obstructed may otherwise detract from the illusion or impression created by the longitudinally driven belt 12.

Thus far what has been described will be understood to be known, being fully disclosed in the prior art as exemplified by previously mentioned U.S. Patent No. 2,711,593 and as previously stated herein is the preferred means utilized in the improved visual apparatus of the present invention to simulate an airfield and more important the previously mentioned basic motion of flight movement relative to said simulated airfield. However, what now will be described is the improved method and means by which the previously mentioned flight motions of roll, pitch, yaw, lateral drift and altitude variation are simulated, and which method and means will be understood to be the crux of the present invention.

Referring to Fig. 1, one embodiment of the improved visual apparatus of the present invention is shown therein, the same being comprised of the combination with said previously described longitudinally driven belt 12 having the described simulated airfield markings thereon of a television camera 32 positioned at a vantage point at one end of the fixed table 13 for viewing the said belt 12, and having a mounting which according to the teachings of the present invention is movable in a plurality of directions relative to the belt to thereby simulate the previously mentioned flight motions of roll, pitch, yaw, lateral drift and altitude variation. Thus, due to the presence of the television camera 32 in the position illustrated, a pilot or trainee seated in and operating the flight trainer 10 will experience the sensation of approaching the simulated airfield due to movement of the belt 12 in the direction of the arrow B and due to the visual impression thereof transmitted by the television camera 32 through a closed television circuit to a stationary television receiver 33 positioned just forward of the trainer 10. And, further, since the mounting for the said television camera 32 is movable, should he for example decide that successful landing requires adjustment in altitude, he would merely manipulate the appropriate flight effecting controls in the trainer 10, with the result that a signal corresponding to the degree of trainer control manipulation is fed to the said movable mounting causing an appropriate change in height of the television camera 32 relative to the belt 12.

One form that the mounting for the television camera 32 may take so as to be movable relative to the belt 12 to the end of simulating all of the previously mentioned five flight motions is shown generally in Fig. 1 and more specifically in Fig. 2. Referring to these figures, the television camera 32 is shown to be disposed in a suitable bearing mounting 34 within a gimbal ring 35, and due to its bearing mounting is rotatable about its longitudinal axis and is thereby well adapted to simulate the flight motion of roll. The gimbal ring 35 in turn has horizontal gimbal pivots 36 on opposite sides thereof pivotally disposed in the upstanding arms of a U-shaped frame member or fork 37, and being thusly pivotable about a horizontal axis through said gimbal pivots 36 is thereby well adapted to permit movement of the television camera 32 so as to simulate the flight motion of pitch. Dependent from the fork 37 is a camera post 38, which post is carried within a bearing 39 pivotally connected at spaced points 40 and 41 to the ends of a pair of horizontally disposed parallel members 42 and 43. Due to the bearing mounting for the post 38 it is rotatable about its vertical axis, and is thereby well adapted to permit movement of the television camera 32 so as to simulate the flight motion of yaw. The opposite ends of said parallel members 42 and 43 are mounted by pins 44 and 45 respectively to spaced blocks on a second rotatable post 46 so as to be simultaneously pivotable about said pins in a vertical plane, and when partaking of this movement in turn causes movement of the said camera post 38 in opposite directions along its said vertical axis. As a result of this degree of movement, the television camera 32 is well adapted to simulate the flight motion of altitude variation. Further, inasmuch as the said second post 46 is rotatable, the entire television camera mounting structure as just described, while partaking of the degree of movement this affords permits the television camera 32 to simulate the flight motion of lateral drift. This is to say that by virtue of being pivotable about said second post 46, the television camera 32, using the previously mentioned horizontal axis of the gimbal pivots 36 as a reference, is movable in opposite directions therealong and is thereby well adapted to simulate the flight motion of lateral drift.

To actually cause movement of the television camera 32 as just described, use is preferably made of servo motors each having an operating arm which when rotated in response to a signal input fed thereto from the trainer 10 transmits through movement of a suitable link a corresponding degree of rotation to an arm appropriately connected to the television mounting structure just described so as to produce the desired movement of the said television camera 32. Thus as best seen in Fig. 4, an arm 47 is fixedly connected to the television camera 32, and as best seen in Fig. 2, a servo motor 48 operating through a pull linkage 49 connected between the servo motor operating arm 50 and said arm 47 in obvious manner causes movement of the television camera 32 about its longitudinal axis to simulate the flight motion of roll. In like manner and as best seen in Fig. 2, a servo motor 51 operates through a pull linkage 52 connected between its operating arm 53 and an arm 54 provided on the gimbal ring 35 to cause movement simulating the flight motion of pitch; a servo motor 55 operates through a pull linkage 56 connected between its operating arm 57 and an arm 58 provided on the rotatable post 38 to cause movement simulating the flight motion of yaw; a servo motor 59 operates through a link 60 connected between its operating arm 61 and an arm 62 provided on the rotatable post 46 to cause movement simulating the flight motion of lateral drift; and lastly a servo motor 63 provided with a reduction gear attachment 64 operates through a link 65 connected between the operating arm 66 of said attachment and a bracket connected to parallel member 43 to cause movement simulating altitude change. The counter-balance springs 67 connected between the stationary frame 68 and parallel member 43 help support the weight of the camera mounting structure.

It will be understood that the embodiment of the visual apparatus of the present invention is not to be limited to the specific construction or arrangement of parts shown, but that it may be widely modified within the invention as defined by the appended claim.

What is claimed is:

A visual apparatus for a pilot trainer comprising a fixed frame, an endless belt having airfield markings, means mounting the endless belt on the frame, and means for driving said belt longitudinally along said frame; camera mounting mechanism including a camera post, a camera frame mounting the camera post at the end of the belt for vertical, lateral, and rotary movement, a horizontal laterally extending gimbal pivot carried by the post, a gimbal member mounted on the gimbal pivot, and camera mounting means carried by the gimbal member to mount a television camera and rotatable on the gimbal member about the optical axis of the television camera.

References Cited in the file of this patent

UNITED STATES PATENTS

| | | |
|---|---|---|
| 2,027,527 | Hammond | Jan. 14, 1936 |
| 2,298,476 | Goldsmith | Oct. 13, 1942 |
| 2,413,633 | Jones | Dec. 31, 1946 |
| 2,516,069 | Newhouse et al. | July 18, 1950 |
| 2,711,593 | Lewis et al. | June 28, 1955 |
| 2,839,840 | Hemstreet | June 24, 1958 |
| 2,871,578 | Faisandier | Feb. 3, 1959 |
| 2,883,763 | Schaper | Apr. 28, 1959 |

FOREIGN PATENTS

| | | |
|---|---|---|
| 554,518 | Canada | Mar. 18, 1958 |